Patented May 12, 1942

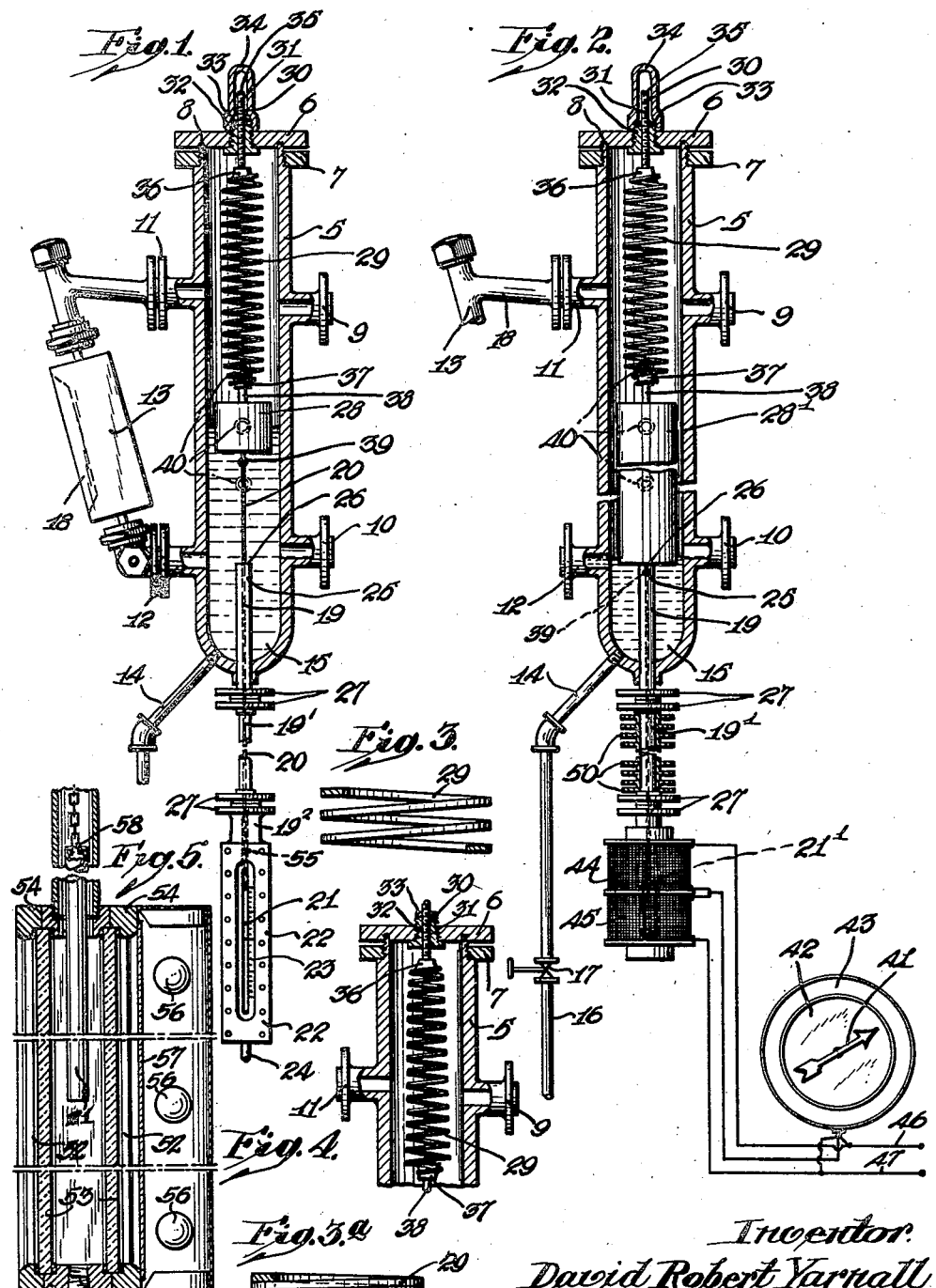

2,282,538

UNITED STATES PATENT OFFICE 2,282,538

SPRING-SUPPORTED SOLID FLOAT INDICATOR

David Robert Yarnall, Philadelphia, Pa., assignor to Yarnall-Waring Company, Philadelphia, Pa., a corporation of Pennsylvania Application August 3, 1939, Serial No. 288,231

16 Claims. (Cl. 73—309)

The invention relates to water gauges for boilers of the so-called eye line water level type in which the indication of the water level is given at a point very much below the level of the water and in position for convenient reading by the operator.

The application is a continuation in part of my application for Spring supported solid float indicator, filed June 3, 1937, Serial No. 146,177.

One purpose of the invention is to use a suspension spring above a solid float to support a target at a distance below the float, free from contact of the suspension with the sides so that the spring, float and target shall be free from any and all starting friction.

A further purpose is to use a solid float partially supported by a suspension spring, preloading the spring in order that its loading may properly balance any predetermined weight, in the present case preferably the weight of the float and a target and connection below the float, with or without preloading progressively for the weight of the spring.

Preloading greatly reduces the extension of the spring in use and greatly reduces the column length required. Without it there would be difficulty in installing the device within the normal headroom available.

A further purpose is to provide a suspension spring for a solid float, the spring having low stress and light weight and a large deflection for a given load.

A further purpose is to free a float suspension system from sliding friction.

A further purpose is to provide a suspension spring for the solid float of an eye line water level indicator in which the spring is bodily adjustable up and down, to set it initially and to take up change in the spring.

A further purpose is to provide differential preloading in a suspension spring to take care in each of the turns progressively for the weight of those turns which lie below it, in order that the spring will extend uniformly from end to end.

A further purpose is to adapt a float indicator for a water level having a considerable range of variation to a sight indicator having a short indicating range.

Further purposes will appear in the specification and in the claims.

I have preferred to illustrate my invention by a main form and one modification thereof only, selecting these not only because of their value as practical illustrations of constructions which have been found to be effective but particularly because they well illustrate the principles involved.

Figure 1 is a side elevation largely in central vertical section of one form of my invention.

Figure 2 is a fragmentary corresponding view showing a slightly variant form of the invention.

Figure 3 is a fragmentary section of one form of suspension spring which may be used.

Figure 3a is a fragmentary view showing a portion of the springs of Figure 3 fully retracted.

Figure 4 is a fragmentary side elevation of a spring in place, the spring being preloaded by tapering and the taper and the extent of opening being exaggerated.

Figure 5 is a central vertical section of a target in an eye level casing.

In the drawing similar numerals indicate like parts.

My invention suspends a float, a target and a flexible cord or chain therebetween in such a manner that the entire suspension is free from all initial starting friction, i. e., friction present before motion begins and is extremely small thereafter, attaining the result by spring support for all of these parts. Starting friction is quite objectionable in any indicator of this character not only because of the friction itself but because the friction is greatest at the beginning of any movement and becomes relatively prohibitive when the movement is slight. As distinguished from this, fluid friction which must inevitably be met in any such gauge having a target or float movable in a liquid, is small at any time, is zero up to the time motion actually takes place, and is especially low in the beginning of motion or with a relatively short movement.

My invention avoids all mechanical friction as distinguished from fluid friction except the internal friction within the turns of a spiral spring. This as in the case of fluid friction is zero until motion actually takes place.

At the same time that my spiral spring is used therefore to reduce the amount of friction it centers the target and its entire suspension with respect to the enclosing side walls and partly supports the float so as to reduce the amount of travel of an eye line indicator target with respect to the range of rise and fall of the water level.

The present mechanism provides any predetermined ratio of movement of the target with respect to the water level variation within wide limits.

The invention is applicable to the normal water column and normal eye line water level indicator with trifling changes requiring no external change except as to the cap. It is further applicable to special forms of indicators in which the freely suspended target cooperates with the character of indication.

A normal water column 5 is closed at the top by cap 6 bolted to a water column flange 7, the joint being protected by packing 8.

Steam and water connections are shown at 9 and 10 respectively and two flanged connections are shown at 11 and 12 for attachment of a supplemental or auxiliary water level gauge of any suitable type of which a fragment only is shown at 13.

This construction along with a drain pipe 14 form sediment chamber 15 having an outlet 16 valved at 17. It is standard and accepted practice.

An inclined gauge is shown in Figure 1 of Yarnall Patent No. 1,933,132, which would be entirely suitable for use with the water column shown if an inclined gauge be desired. A fragment of a gauge is shown at 18 in Figure 1.

Also as standard practice appears piping 19, 19', 19² extending below the water column and providing a protected passageway at boiler pressure for an indicator connection 20 extending beneath the water column float and down to a target 21 whose indication is read within a sight water level indicator 22 having a scale 23. The present invention makes possible the use of a shorter sight water level indicator than was available in the prior art; but some flexible connection 20, suitable piping, and an indicator for a target have been in use for many years, one form being shown in the Yarnall patent above. A very usual drain for the eye line indicator compartment is shown at 24 and, of course, suitably valved.

Though the flexible connection, piping and indicator are generally well known, the parts have not previously been freed from mechanical friction as the suspension rises and lowers. In the present showing care is exercised to avoid engagement of the parts of the suspension with the side walls, and, as compared with the form of my patent, the sliding friction of pulleys and other cooperating parts is avoided.

For the purpose of enabling me to refer freely to the terminal weight at the lower end of the flexible connection below the float in the same language, whether it be truly a target as in Figure 1 where it can be seen and its level may be interpreted directly or be the operating member of an indicator at a distance as, for example, in Figure 2, this weight will be referred to herein as target in both cases.

It has been common also to carry the protective piping 19 up into the lower part of the water column as at 25, providing a sediment chamber in the lower part of the water column, and to use the upper end 26 of this piping as a stop to limit the lower level of float movement within the water column.

In the illustration the piping between the water column and the eye line indicator has been broken up into sections united by large tongue and groove flanges 27. In many instances separation into sections will be necessary on account of the length and even if this be not so, convenience of assemblage and of access is thus served.

Though the superficial appearance and much of the mechanism herein corresponds generally with that of the Yarnall patent above, the operating mechanism by which the fluctuation of water is transferred into movement of an indicating target is widely different from that of the Yarnall patent.

In the present invention a single solid float only is used shown at 28 and it is suspended by a spring 29 from an adjustment 30 within the cap 34. This adjustment may be made conveniently as shown by a threaded bolt 31 sliding through a sleeve 32. The bolt is adjusted in height by a nut 33 which engages the bolt and which rests upon the top of the sleeve. The sleeve is shown as threaded into the cap and the same thread affords a hold for a closing and covering cap 34 which cap acts as a lock nut. The several threads provide a seal whereby leakage is avoided. The cap nut permits removal for adjustment, by a wrench or other tool engaging a noncircular end 35 of the bolt, and effective resealing with replacement.

The spring 29 is shown as engaging a head 36 upon the bolt at the upper spring end and engaging at the lower spring end with a head 37 upon any suitable connection 38 with float 28. The depending flexible connection 20 is fastened to the float in any way as by any hook 39. The character of the connection of these terminal parts is of course unimportant.

For completeness of illustration the try cocks 40 are shown in dot-and-dash.

That the spring be a suspension spring is quite desirable for various reasons. It can be preloaded—not true of the compression spring—and its support at the top is readily accessible for the purpose of adjustment to take up for creeping. But very much more important than either of these, it needs no guides and offers no side friction, whereas a soft spring such as is needed for this purpose having any such length as is desirable for the purpose, if in the form of a compression spring, will tilt unless guided and cannot be compressed to any considerable extent without tending to bulge at intermediate points and engaging the side walls. This of course additionally requires guiding and guiding adds friction.

By preloading is meant winding the coil in such a way that adjoining turns press against each other when the spring is at rest, so that this pressure must be overcome before the turns can begin to separate.

The indicator desirably operates at very small spring stresses. The forces available for operation are not large. Consequently any considerable amount of friction quickly becomes prohibitive.

The difference in effective weight of the parts below the spring suspension at high water level as compared with their weight at low water level forms the effective difference in weight by which different level indications are given. The same weight hangs from the suspension spring all the time, but its pull upon the spring differs by the weight of a corresponding volume of water displaced or replaced when a larger or a smaller length of the weight is exposed above the water level.

It is highly desirable to make this difference in weight for the water level range as large in comparison with the total weight of the suspended parts as possible. For example, if the solid float be of iron it will have perhaps seven times as much weight as that of the water displaced whereas if it be made of aluminum alloy encased in a corrosion resistant shell, the weight of the float will be but little more than three times the weight of the water displaced. A solid carbon weight has also been used successfully. The lighter the solid float, the less stress there will be in the spring, improving the life of the instrument and the constant accuracy of the readings.

The solid metal float may be made of any metal, preferably light metal, of course, which is not corroded unduly by the water. There are many desirable for the purpose if their lightness of weight be such as that of magnesium and aluminum, but either of these if unalloyed is subject to corrosion by the water so that it becomes desirable to use an alloy instead. Aluminum alloy has been used successfully. Magnesium alloy if protected from steam and condensate, may be used.

The economical length of the float to keep the stresses as low as possible will be determined by the range of movement of the target and the ratio between this range and the range of water level fluctuation. For example, with an intended target movement of 12 inches and a range between high and low water indications of 18 inches the length of solid float will be slightly over 6 inches in order to provide for 6 inches distance between the submergence at high water and the submergence at low water; whereas with the same target range, if the range of water level fluctuation in the water column be 3 feet, 6 inches, the solid float length will be slightly in excess of 2 feet, 6 inches.

The cross section of the spring used may be varied accordingly. A contour of cross section which is responsive to low stresses is that shown in Figure 3 in which the spring is a flat strip edge wound so that the flat of the strip is presented axially.

It is intended to use the same dimension of spring support for a range of different diameters and lengths of float which thus becomes standardized. In that event with the same material of float where a greater length of float is desired a smaller diameter is used, and vice versa, to approximate the same weights to be suspended from like springs; and in any given installation changing the float diameter somewhat inversely according to the float length used.

In the form shown in Figure 2 the parts are intended to be the same as the parts shown in Figure 1 except that a long float 28' is shown and the indicating target 21' is not itself a sight indicator but is the actuator for an electromagnetically operated needle 41, movable over a dial 42. The electromagnetic indicator 43 is operated through coils 44 and 45 and the usual circuit connections 46 and 47 from a source of electrical current. This electromagnetic indication of the position of the target in itself is old in the art. The illustration is primarily for the purpose of showing that the suspension of all of the movable parts from a fixed point with their corresponding centering and the freedom from side contact and bearing friction, as well as the greater accuracy obtainable, in the present invention are of advantage whether the ultimate indication is to be determined from a sight target or by other means such as the electromagnetic effect of a movable target upon surrounding coils.

Heat distribution fins are shown at 50 in this figure.

The preloading of the spring may be accomplished easily by holding the wire which is being wound out of line with the normal position of the wire as it is laid in turns, that is, out of parallelism with a tangent to the turn last previously laid. The wire will in that case be diverted laterally at an angle toward the part of the spring which already has been wound, and each turn will press against the preceding turn with a pressure which will be determined by the other characteristics of the spring and by the angle at which the spring material is diverted during winding and by the tension.

To cause all of the turns of the spring to open up together, the preloading of individual turns of the spring should be different according to the height in the spring at which the turns are located, the preloading of each turn, considered as an "upper" turn with respect to the turns below it taking care of the weight below the spring and of the weight of the spring below the turn which is being considered. Progressive change of preloading may be secured in various ways. For example, the angle at which the wire is diverted during winding toward the portion of the spring already wound may be altered, the angle with the normal position at which the turn would be laid being made greater progressively for the turns at the upper part of the spring than for the turns at the lower part of the spring.

Another method of varying the preloading lies in tapering the spring which is preloaded from a smaller diameter at the upper end to a larger diameter at the lower end as seen in Figure 4. One advantage of the tapered spring is that it secures universal stresses throughout the spring. Because the leverage is shorter where the diameter is smaller, the spring will be stiffer at the upper end of smaller diameter than at the lower end of larger diameter. The way in which the winding is effected gives the "preloading" and the very slight taper makes the preloading differential.

In whatever way the preloading is effective it is desirable that the preloading of each turn shall just have been overcome by the weight in water of the solid float and of the parts sustained below it with such weight of spring as lies beneath the turn in question when the solid float is almost completely immersed in water at the upper level of water level fluctuation.

Excellent results have been obtained in practice with a spring of Inconel, (13 Cr, 79.5 Ni and 6.5 Fe) of flat section edgewound, the radial dimension (width) of the strip being .1875 inch and the vertical height (thickness) of the individual strip .056 inch. The outside diameter of the coils used was $2\frac{5}{16}$ inches and from 120 to 135 turns of strip have been used successfully.

It was found that with progressive preloading so that the coils will just open as the water level begins to lower, and an initial load of 2¾ pounds, each additional pound of weight added slightly increases the spacing between adjacent turns of the coil.

The information above is given without intention in the least to restrict the charatcter or dimensions of coil spring which may be used or the material of which it may be made; and for the purpose merely of teaching the public one example of spring by which the invention can be carried out.

In Figure 5 additional detail is given of a type of sight target and target casing which have been used successfully in a structure such as that of Figure 1.

The body 51 of the casing is slotted through from front to back at 52 and is closed at front and back by glass plates 53 held in position by front and rear facing slotted plates 54.

The target is centered within the lower part 55 of the connection 19', ample room being given so that there is no danger of the target or suspension engaging the side walls.

The target projects down into the target casing to much or less extent according to the float level. The target is colored distinctively from the color of the water, desirably red, and the red is brought out by lights 56 back of the target, the color of the light containing the color (such as red) of the target. The light preferably is diffused by a screen 57 which may also be a colored screen or two screens may be used also to give a distinctive cast—such as green—to the water below and permissibly at one or both sides of the target according to the size and position of the target with respect to the slots.

The target is suspended from the top, as at 58.

The structure of Figure 5 differs from that of the other figures in that the chain detail of a flexible connection for the target is given and that the intermediate fluid-tight connections above the target are free from flanges. A drainage outlet is shown at 59.

In operation the solid float is preferably almost completely immersed in the water at the upper water level and is of such length that it will almost completely be out of the water at the lower level. The spring may therefore be standardized to the extent that, with different lengths of solid float the same spring or a few standard springs only will serve for installations having wide differences in water level fluctuation. The length of variation of water level on the float equals the difference between the target movement at the indicator and the range of water level fluctuation. This permits ready accommodation of the invention to different water columns corresponding with the different boiler conditions.

The same spring float indicator connections will give slightly different readings with different boiler pressures due to the fact that the density of the water is increased at higher pressure as compared with that at lower pressures; but this is not great because the density of the steam increases also with the pressure. Any deviation due to this cause can be taken care of by the adjustment of the indicating target and/or by calibration.

It will be evident that the low stresses and high flexibility of the spring may be secured by other spring constructions than that disclosed and that other methods of indication than the sight indicator and the electromagnetic indicator shown may be used if desired.

The so-called solid float is in effect a displacement member which is heavier than water and thus does not actually float, but is of less effective weight in proportion to the water displacement by it in its different positions. It acts along with the spring to set a different point of extension of the spring for any height of water level than would be the case if variant parts of the solid float were not immersed.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In an indicator for water level, a float chamber casing, a longitudinally resilient tension support therein free from mechanical frictional resistance, a solid float suspended from the support substantially submerged at highest water level and substantially out of the water at lowest water level, walls forming a target casing, fluid-tight connections between the target casing and the float chamber casing, a target within the target casing suspended from the float, the float, connections and target being free from lateral engagement with their surrounding walls, whereby the target and its entire suspension are free from all initial starting friction.

2. In an indicator for water level, a float chamber casing, a longitudinally resilient tension spring support therein free from mechanical frictional resistance, a solid float suspended from the support substantially submerged at highest water level and substantially out of the water at lowest water level, walls forming a target casing, fluid-tight connections between the target casing and the float chamber casing, a target within the target casing suspended from the float, the float, connections and target being free from lateral engagement with their surrounding walls, whereby the target and its entire suspension are free from all initial starting friction.

3. In an indicator for water level, a float chamber casing, a tension spring supported therein preloaded to compensate for lower spring turns and for the weight below it, free from mechanical frictional resistance, a float suspended from the support, walls forming a target casing, fluid-tight connections between the target casing and the float chamber casing and a target within the target casing suspended from the float, the float, connections and target being free from lateral engagement with their surrounding walls, whereby the target and its entire suspension are free from all initial starting friction.

4. In an eye line water level indicator, a water column, a suspension spring therein, a solid float suspended from the lower end of the spring substantially submerged at highest water level and substantially out of the water at lowest water level, a wholly submerged target depending from the lower end of the float and walls surrounding the target and connections and spaced therefrom whereby initial starting friction is eliminated and the parts are subject to the internal friction of the spring and to fluid friction only.

5. In an eye line water level indicator, a water column, a solid float in said column substantially submerged at highest water level and substantially out of the water at lowest water level, indicator parts depending from the float and a tension spring having lowest stresses and highest flexibility sustaining the effective weight of the float and of the indicator parts and providing for substantial submergence of the float at highest water level and substantial emergence of the float from the water at lowest water level.

6. In an eye line water level indicator, a closed water column, a solid float therein, a suspension spring supported at its upper end and sustaining the float, a target, flexible connections for the target depending from the float and walls surrounding the flexible connections and target and connected with the column whereby they are maintained at boiler pressure, the suspension spring being preloaded to substantially the weight of the parts supported by it.

7. In an eye line water level indicator, a closed water column, a solid float therein, a suspension spring supported at its upper end and sustaining the float, a target and connections for the target depending from the float and walls surrounding the connections and target and connected with the column whereby the parts are maintained at boiler pressure, the turns of the suspension spring being preliminarily loaded differentially to take care of the weight of the solid float, of the submerged parts suspended below it and progressively for the weight of the parts of the spring below the individual turns.

8. In an eye line water level indicator, a closed water column, a solid float therein, a suspension spring supported at its upper end and sustaining the float, a target, connections therefor depending from the float and walls surounding the connections and target and connected with the column whereby they are maintained at boiler pressure, the spring being tapered progressively, of smaller diameter in its upper portion than in its lower portion and preloaded to take care of the weight of the solid float and of the parts suspended below it and the preloading by reason of the difference in diameter will take care also in each turn of the spring progressively of the parts of the spring below it.

9. In an eye line water level indicator, a closed water column, a solid float therein, a suspension spring supported at its upper end and sustaining the float, a target and connections therefor depending from the float and walls surrounding the connections and target and connected with the column whereby the parts are maintained at boiler pressure, the spring being preloaded progressively so that the initial pressure of the upper turns against the preceding turns is greater than the initial pressure of the lower turns against their preceding turns and the preloading takes care in water of the weight not only of the solid float and parts suspended below it but also in each turn of the weight of the turns of the spring below it.

10. In an eye line water level indicator, a closed water column, a solid float therein, a suspension spring supported at its upper end and sustaining the float, a target, connections therefor depending from the float and walls surrounding the connections and target and joined to the column, whereby the parts are maintained wholly submerged and at boiler pressure, the length of the float and the support by the spring being such that the float will be almost entirely submerged at high water level and that the float will be almost wholly above the water level at low water level.

11. In an eye line water level indicator, a closed water column, a solid float therein, a suspension spring supported at its upper end and sustaining the float, a target, connections therefor depending from the float and walls surrounding the connections and target and joined to the column whereby the parts are maintained at boiler pressure, the spring being preloaded to take care of the weight of the solid float and parts suspended by it so that the turns of the spring open evenly with downward float movement when the float is substantially submerged at high water level and continue to open with lowering of the water level until at the low water level the float is substantially free from immersion in the water.

12. In an eye line water level indicator, a closed water column, a solid float therein substantially submerged at highest water level and substantially out of the water at lowest water level, a suspension spring supported at its upper end, connected to the float and sustaining the float, a target, flexible connections therefor depending from the float and walls surrounding the flexible connections and target and joined to the column whereby the parts are maintained at boiler pressure, the spring being a soft spring subjected to low stress having flexibility and range of expansion providing the range of float submergence indicated between highest and lowest water levels.

13. In an eye line water level indicator, a water column, a preloaded spring therein, a solid float suspended by the spring, of such float length as to be almost totally submerged in the water at high water level and almost totally emerged from the water at low water level and an indicating target suspended from the float and subjected to water column water pressure, the preloading providing for clearance of the turns away from one another on downward movement from high water level.

14. In an eye line water level indicator, a water column, a preloaded spring therein, a solid float suspended by the spring, of such float length as to be almost totally submerged in the water at high water level and almost totally emerged from the water at low water level and an indicating target suspended from the float and subjected to water column water pressure, the preloading compensating for the weight of the solid float, target and connections.

15. In an eye line water level indicator, a water column, a preloaded spring therein, a solid float suspended by the spring, of such float length as to be almost totally submerged in the water at high water level and almost totally emerged from the water at low water level and an indicating target suspended from the float and subjected to water column water pressure, the preloading compensating for the weight of the float, the suspension from the float and approximately the weight of the spring so that the weight overcomes the preloading substantially at high water level.

16. A liquid level gauge comprising a preloaded spring having the turns of the spring differentially pressing against each other when without load, decreasing in pressure of one turn against the other from the top to the bottom when without load to an extent adapted to take care of the weight of the spring below it and of a predetermined load below the spring, a float partly supported through the spring and a target suspended from the spring.

DAVID ROBERT YARNALL.